(No Model.) 2 Sheets—Sheet 2.
A. B. IRELAND.
CLUTCH.
No. 565,002. Patented Aug. 4, 1896.
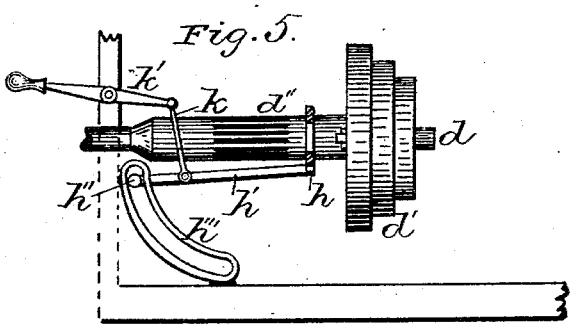
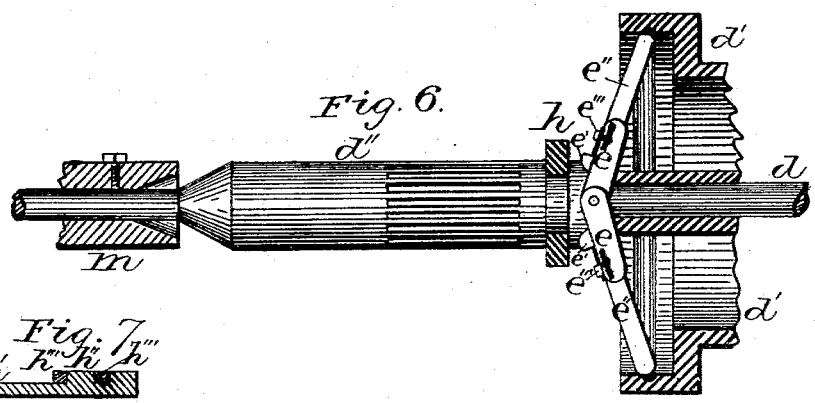
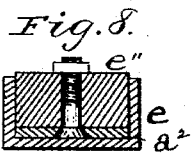
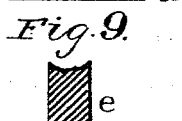
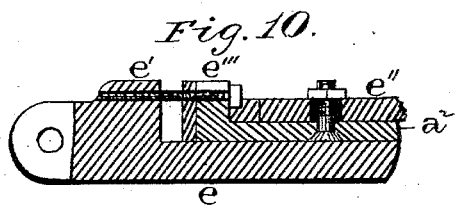
WITNESSES:
Charles W. Marvin.
Conr. Schoeneck.
INVENTOR
A. B. Ireland.
BY
Smith & Amson
ATTORNEYS.

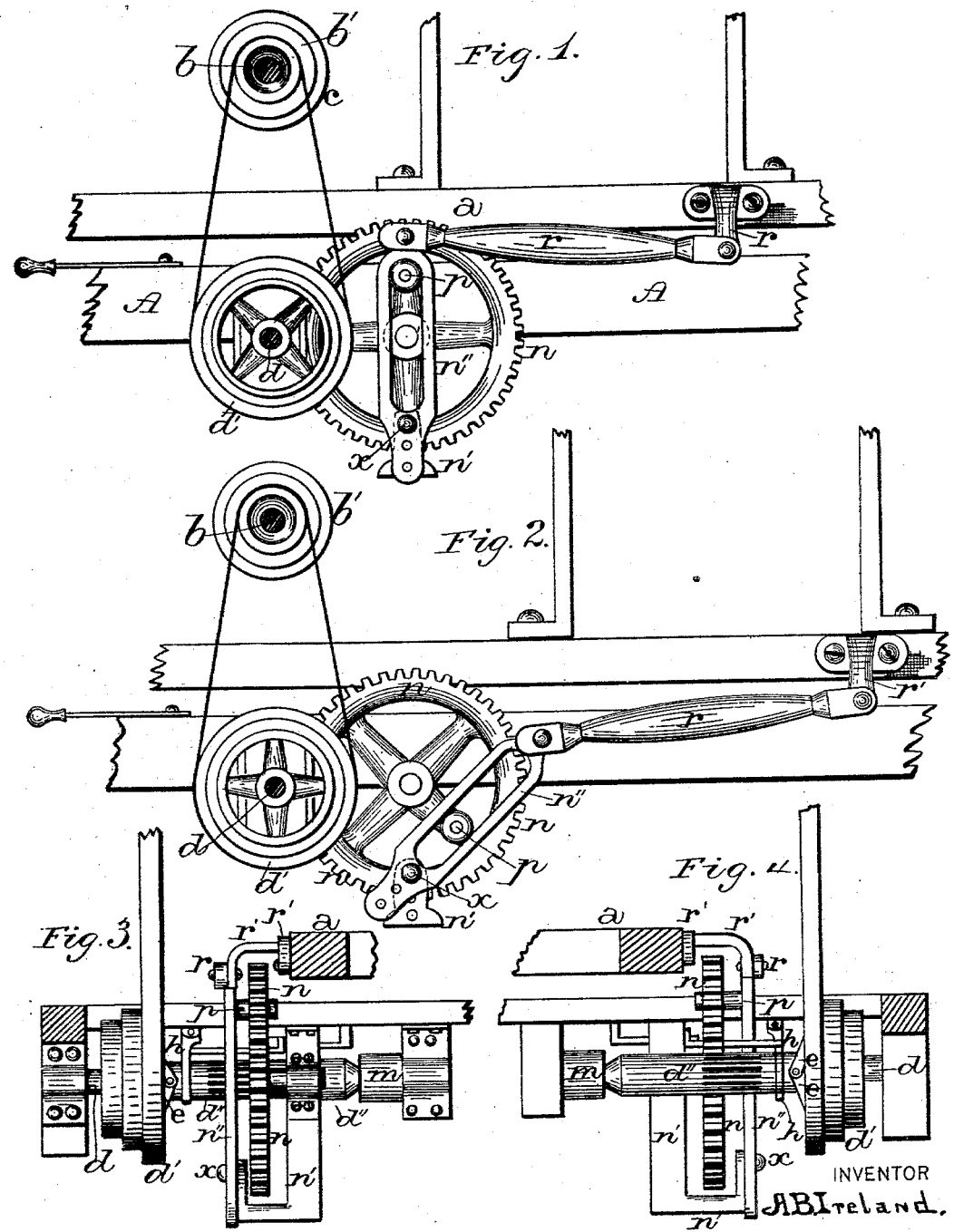

UNITED STATES PATENT OFFICE.

A BERTSELL IRELAND, OF GREENE, NEW YORK.

CLUTCH.

SPECIFICATION forming part of Letters Patent No. 565,002, dated August 4, 1896.

Application filed December 4, 1893. Serial No. 492,732. (No model.)

*To all whom it may concern:*

Be it known that I, A BERTSELL IRELAND, of Greene, in the county of Chenango, in the State of New York, have invented new and useful Improvements in Clutches, of which the following, taken in connection with the accompanying drawings, is a full, clear, and exact description.

My invention relates to an improvement in clutches; and it consists in the arrangement and combination of parts whereby the arms of the clutch are made adjustable in length.

It also consists in a support for the slotted link, journaled upon a wheel for operating it, whereby the length of movement of the table is regulated, as will be more fully described hereinafter.

Figures 1 and 2 are side elevations of a clutch which embodies my invention, the parts being shown in different positions. Figs. 3 and 4 are edge views of the parts shown in Figs. 1 and 2, taken from opposite edges. Figs. 5, 6, 7, 8, 9, and 10 are detail views of the clutch.

A is the bed of the machine. $a$ is the table mounted thereon upon suitable ways.

$b$ is the saw-shaft, suitably journaled and driven by the pulley $b'$. $c$ is the primary carriage-driving pulley secured on said shaft. $d$ is a shaft fixed in the bed. $d'$ is a pulley loose thereon. $d''$ is a combined sleeve and pinion loose upon said shaft and having arms $e$ hinged on opposite sides of the plain sleeve portion, each having an ear $e'$. A wooden arm $e''$ is secured to a slide $a^2$, placed between the slotted flanged sides, and from which piece project clamping-bolts which extend through slots in the flanges, each slide having an ear $e'''$, so that thereby the projection of each arm is adjusted. The inside of the rim of said pulley is grooved, and when the sleeve is moved toward the hub of the pulley said arms are projected into said groove, and by frictional engagement the sleeve and pinion are rotated. A yoke $h$ is in engagement with the groove in said sleeve through a pin or pins (not shown) projecting from said yoke into said groove in the usual way and pivoted at one end to the bed. $h'$ is a lever pivotally connected to the yoke, having a lug $h''$ in engagement with the curved cam-groove $h'''$ in the bar secured to the bed. $k$ is a connecting-rod connecting the hand-lever $k'$ to said yoke, said lever being pivoted in the edge of the bed, so that by it the clutch is operated.

The outer end of the sleeve and pinion is beveled substantially as shown, and $m$ is a collar secured to the shaft $d$ and having one end beveled, so that when the sleeve-pinion is shifted to open the clutch the beveled faces of the pinion and collar by their frictional engagement operate together as a brake to stop the rotation of the pinion.

The rotation of the sleeve and pinion $d''$ drives the gear $n$, journaled upon the side of the frame A, and this wheel is provided with a wrist-pin $p$, provided with a friction-roller, and which catches in the slot of and rocks the link $n''$ upon its pivot $x$. To the upper end of the link is fastened the pitman $r$, which has its other end fastened to the reciprocating table $a$ by means of the bracket $r'$. Through the lower end of the link is formed a series of perforations, so that the link can be adjusted upon the pivot $x$ to give a longer or shorter throw, as may be desired. Extending down from the under side of the table is the support $n'$, which projects below the lower edge of the gear $n$, and which has its lower end turned forward and upward, and through the upturned end are formed a series of perforations which correspond to those in the link.

By shifting the bolt $x$ into one of the other holes shown, the pivot of the link is shifted, so as to change its distance from the center of the gear $n$ or its shaft, and while this does not change the speed of the forward movement of the table from the slow feed at which it is set, yet it speeds and quickens the backward movement of the table, giving it high speed from the start backward until it passes the center of this movement, and then gradually slows down until it reverses for the forward movement again. In this manner I accomplish a slow forward movement and a much quicker return, a function which is not inherent in the somewhat analogous mechanisms in which the pivot of the link is not adjustable and cannot be changed. The roller upon the spoke of the gear is also adjustable by means of a slot (not shown) in the spoke, radial to the gear, and shifting the pivot-bolt of said roller, so that when the link-pivot is shifted the roller can also be correspondingly shifted to vary the throw of the link and consequently vary the distance of the traverse of the table.

It will be seen that this brake device can be adapted to any clutch-sleeve in which it is desired to quickly stop the rotation of the sleeve, especially when it thereby actuates a heavy body, as the table shown, and to overcome the momentum of said body quickly.

What I claim as my invention, and desire to secure by Letters Patent, is—

1. The wheel $n$, provided with a wrist-pin, and journaled on the side of the frame, and the hanger $n'$ secured to the same side of the frame and extending down below the edge of the wheel and having its lower end to extend across under the wheel and turn up so as to form a support for the link below and in front of the wheel, combined with the slotted link, provided with a series of perforations through its lower end, a pitman connected to the upper end of the link, a reciprocating table, and means for driving the wheel, substantially as shown.

2. A clutch composed of metallic arms $e$ pivoted upon the end of the sleeve, and each one provided with an ear $e'$, and slotted side flanges, the slides $a^2$ also provided with ears $e'''$ and held between slotted flanges of the arms $e$; the wooden friction-arms $e''$ clamped to the slides $a^2$ and the right and left threaded bolt which is passed through the ears, substantially as described.

In witness whereof I have hereunto set my hand this 6th day of November, 1893.

A BERTSELL IRELAND.

In presence of—
J. E. BARTON,
HOWARD P. DENISON.